US011640294B2

(12) United States Patent
Garg et al.

(10) Patent No.: US 11,640,294 B2
(45) Date of Patent: May 2, 2023

(54) MACHINE-GENERATED EXAMPLES OF COMMAND-LINE COMMANDS WITH PARAMETER VALUES

(71) Applicant: MICROSOFT TECHNOLOGY LICENSING, LLC., Redmond, WA (US)

(72) Inventors: Spandan Garg, Calgary (CA); Jason R. Shaver, Redmond, WA (US); Neelakantan Sundaresan, Bellevue, WA (US); Roshanak Zilouchian Moghaddam, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 346 days.

(21) Appl. No.: 16/861,645

(22) Filed: Apr. 29, 2020

(65) Prior Publication Data
US 2021/0342654 A1      Nov. 4, 2021

(51) Int. Cl.
*G06N 3/02*       (2006.01)
*G06F 9/455*      (2018.01)
*G06K 9/62*       (2022.01)
*G06N 20/00*      (2019.01)
*G06N 5/04*       (2023.01)
(Continued)

(52) U.S. Cl.
CPC ...... *G06F 9/45512* (2013.01); *G06F 16/9024* (2019.01); *G06K 9/6256* (2013.01); *G06K 9/6282* (2013.01); *G06N 5/04* (2013.01); *G06N 20/00* (2019.01); *G06N 3/0454* (2013.01); *G06N 3/084* (2013.01); *H04L 67/125* (2013.01)

(58) Field of Classification Search
CPC .... G06K 9/6282; G06K 9/6256; G06N 20/00; G06N 5/04; G06N 3/084; G06N 3/0454; G06F 9/45512; G06F 8/437; G06F 16/3347; G06F 16/16; G06F 3/04886; G06F 16/9024; H04L 67/125
See application file for complete search history.

(56) References Cited

U.S. PATENT DOCUMENTS

2017/0060894 A1\*  3/2017  Gorelik .................. G06F 16/16
2017/0199664 A1\*  7/2017  Medlock ............. G06F 3/04886
(Continued)

OTHER PUBLICATIONS

Asaduzzaman, et al., "Answering Questions about Unanswered Questions of Stack Overflow", In Proceedings of 10th Working Conference on Mining Software Repositories (MSR), May 18, 2013, pp. 97-100.
(Continued)

*Primary Examiner* — Tuan A Vu

(57) ABSTRACT

Examples of the usage of a command of a command line interface includes the command with a set of parameters and corresponding parameter values. The examples are generated from telemetry data, which does not contain parameter values, and from web-based sources that may contain multiple parameter values. A machine learning model is used to predict the data type of a parameter value when the parameter is used with a particular command. The predicted data type is then used to select an appropriate parameter value for the example from multiple known parameter values or to generate a parameter value when no known parameter value exists.

20 Claims, 11 Drawing Sheets

(51) Int. Cl.
*G06F 16/901* (2019.01)
*G06N 3/04* (2023.01)
*H04L 67/125* (2022.01)
*G06N 3/084* (2023.01)

(56) References Cited

U.S. PATENT DOCUMENTS

| | | | | |
|---|---|---|---|---|
| 2017/0213132 | A1* | 7/2017 | Hammond | G06F 8/437 |
| 2018/0173698 | A1* | 6/2018 | Dubey | G06F 16/3347 |
| 2019/0236210 | A1* | 8/2019 | Makaremi | H04L 67/125 |
| 2019/0303567 | A1* | 10/2019 | Batmaz | G06N 3/0454 |
| 2020/0065710 | A1* | 2/2020 | Range | G06F 16/9024 |
| 2020/0327225 | A1* | 10/2020 | Nguyen | G06N 3/084 |

OTHER PUBLICATIONS

Cubranic, et al., "Hipikat: Recommending Pertinent Software Development Artifacts", In Proceedings of the 25th International Conference on Software Engineering, May 3, 2003, pp. 408-418.

Dekel, et al., "Improving API Documentation Usability with Knowledge Pushing", In Proceedings of IEEE 31st International Conference on Software Engineering, May 16, 2009, pp. 320-330.

Forward, et al., "The Relevance of Software Documentation, Tools and Technologies: A Survey", In Proceedings of the ACM Symposium on Document Engineering, Nov. 8, 2002, pp. 26-33.

Gulwani, Sumit., "Automating String Processing in Spreadsheets Using Input-Output Examples", In Proceedings of the 38th Annual ACM SIGPLAN-SIGACT Symposium on Principles of Programming Languages, Jan. 26, 2011, pp. 317-330.

Holmes, et al., "Using Structural Context to Recommend Source Code Examples", In Proceedings. 27th International Conference on Software Engineering, May 15, 2005, pp. 117-125.

Kandel, et al., "Wrangler: Interactive Visual Specification of Data Transformation Scripts", In Proceedings of the SIGCHI Conference on Human Factors in Computing Systems, May 7, 2011, pp. 3363-3372.

Ko et al., "Six Learning Barriers in End-User Programming Systems", In Proceedings of the IEEE Symposium on Visual Languages—Human Centric Computing, Sep. 26, 2004, 8 Pages.

Lau, et al., "Programming by Demonstration Using Version Space Algebra", In Journal of Machine Learning, vol. 53, Oct. 1, 2003, pp. 111-156.

Lethbridge, et al., "How Software Engineers Use Documentation: The State of the Practice", In Journal of IEEE Software, vol. 20, Issue 6, Nov. 3, 2003, pp. 35-39.

Liang, et al., "Learning Programs: A Hierarchical Bayesian Approach", In Proceedings of the 26th International Conference on Machine Learning, Jun. 21, 2010, 8 Pages.

Mamykina, et al., "Design Lessons from the Fastest Q&A Site in the West", In Proceedings of the SIGCHI Conference on Human Factors in Computing Systems, May 7, 2011, pp. 2857-2866.

Mandelin, et al., "Jungloid Mining: Helping to Navigate the API Jungle", In Proceedings of the 2005 ACM SIGPLAN Conference on Programming Language Design and Implementation, Jun. 12, 2005, pp. 48-61.

McBurney, et al., "Automatic Documentation Generation via Source Code Summarization of Method Context", In Proceedings of the 22nd International Conference on Program Comprehension, Jun. 2, 2014, pp. 279-290.

Miller, et al., "Interactive Simultaneous Editing of Multiple Text Regions", In Proceedings of USENIX Annual Technical Conference, Jun. 25, 2001, pp. 161-174.

Pagano, et al., "How Do Developers Blog? An Exploratory Study", In Proceedings of the 8th Working Conference on Mining Software Repositories, May 21, 2011, pp. 123-132.

Parnas, et al., "A Rational Design Process: How and Why to Fake It", In Journal of IEEE Transactions on Software Engineering, vol. SE-12, Issue 2, Feb. 1986, pp. 251-257.

Parnin, et al., "Crowd Documentation: Exploring the Coverage and the Dynamics of API Discussions on Stack Overflow", In Georgia Tech Technical Report, May 2012, 11 Pages.

Robillard, et al., "Recommending Reference API Documentation", In Publication of Empirical Software Engineering, vol. 20, No. 6, Dec. 1, 2015, 28 Pages.

Robillard, Martin P.., "What Makes APIs Hard to Learn? Answers From Developers", In Journal of IEEE Software, vol. 26, Issue 6, Nov. 2009, pp. 27-34.

Robins, et al., "Learning and Teaching Programming: A Review and Discussion", In Journal of Computer Science Education, vol. 13, Issue 2, Jun. 1, 2003, pp. 137-172.

Sahavechaphan, et al., "XSnippet: Mining for Sample Code", In Proceedings of the 21st Annual ACM SIGPLAN Conference on Object-Oriented Programming Systems, Languages, and Applications, Oct. 22, 2006, pp. 413-430.

* cited by examiner

MACHINE-GENERATED EXAMPLES OF COMMAND-LINE COMMANDS WITH PARAMETER VALUES

BACKGROUND

A command line interface (CLI) is a user interface in which a user enters commands of a CLI-based application in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is, several tasks can be specified in a single text string thereby eliminating numerous interactions with the GUI.

The use of a command line interface requires a user to be familiar with the commands supported by the CLI-based application and the correct syntax of the commands. Often, there are a large number of commands with each command having various parameters and parameter values. The availability of good reference documentation for the commands may be limited or outdated as the syntax of the commands changes dynamically. The lack of up-to-date documentation and examples impacts the usefulness of the command line interface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Examples of the correct usage of a command of a command line interface are generated automatically in order to provide real-time assistance to a user of the CLI and to update the CLI online documentation regularly with new or updated commands. A command includes one or more parameters and each parameter contains a parameter value. Each parameter value is associated with a data type or type which identifies the type of data the parameter value takes on.

A command line interface may include hundreds of commands, each with multiple parameters, and corresponding parameter values. Human-generated examples from software developers are limited since they cover a small portion of the functions and features supported by the command line interface. Machine-generated examples are able to cover more commands and more functions especially when there are various combinations that are possible for a command, parameter, and parameter value. The machine-generated examples are also capable of generating correct usage examples of more complex combinations.

The examples are generated from telemetry data, which does not contain parameter values, and from web-based sources that may contain multiple parameter values. A machine learning model is used to predict the data type of a parameter value when the parameter is used with a particular command. The predicted data type and a data type format are then used to select an appropriate parameter value for a paired command-parameter combination from multiple known parameter values or to generate a parameter value consistent with the predicted data type when no known parameter value exists. The data type format is a regular expression that indicates whether the data type takes on range of values, a single value, or a specific character string.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to the generation of examples showing the usage of command-line commands that have parameters with parameter values. A command-line command typically includes a command name and one or more parameters, with each parameter having one or more parameter values. Templates for the examples are generated from telemetry data and publicly-accessible sources. The telemetry data provides examples that represent how the current users of the CLI-based application are using the commands. However, the telemetry data does not contain parameter values since these values often contain personal or private data that is eliminated from the telemetry data. The publicly-accessible sources provide examples which may be incomplete. Due to these issues, a template may contain multiple parameter values or none at all.

In order to provide useful examples, a machine learning model is trained to predict the data type of a parameter value for a particular command and parameter. The predicted data type and the format associated with the data type are then used to select an appropriate parameter value from among multiple parameter values and to generate an appropriate parameter value in the event none are known.

The machine learning model may consist of one or more random forest models trained to predict a data type of a parameter value for a particular combination of a command and parameter. Due to the imbalance of the data types of the parameter values, two random forest models are trained to infer the data type of a parameter value. A first random forest is trained on parameter names, command names, and module names to predict a string type and a second random forest is trained on parameter and command descriptions to predict a non-string type.

Attention now turns to a further discussion of the system, devices, components, and methods utilized in generating examples of the usage of a CLI command with parameter values.

System

Figure 1:
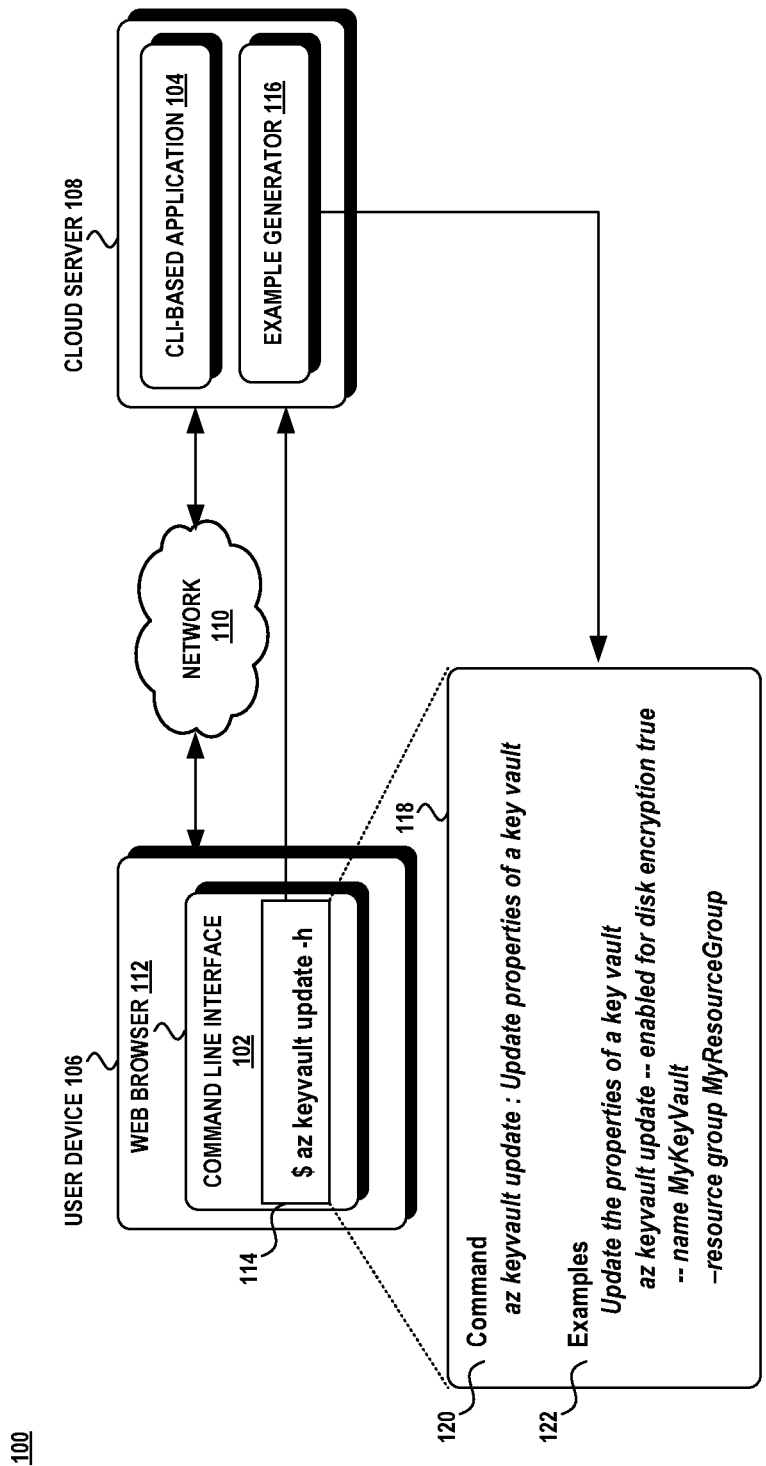
FIG. 1 illustrates an exemplary system using machine-generated examples of CLI command usage.

FIG. 1 illustrates an exemplary system 100 in which various aspects of the invention may be practiced. The system 100 includes a user device 106 having a CLI 102 coupled to a CLI-based application 104. The system 100 can be used to perform CLI commands for various CLI-based applications, such as deployment of one or more processing components for a computing environment. The CLI-based application 104 requires CLI commands entered to perform desired computer operations.

In one aspect, the computing environment is a cloud computing environment in which the user device 106 is communicatively coupled to a cloud server 108 through a network 110. The CLI-based application 104 is a cloud-based application that receives commands initiated from the user device 106. In one aspect, the CLI-based application 104 may be a cloud management and deployment application. The CLI 102 may be a shell program that is executed through a web browser or rich client application 112.

The CLI 102 enables a user of the user device 106 to access resources on the cloud service through text-based commands. In one aspect, commands are entered into a command prompt or input field of the CLI and transformed into Representational State Transfer (REST) Application Programming Interfaces (API)s. The REST APIs are service endpoints that support a set of HTTP operations or methods to create, retrieve, update, delete or access resources on the cloud service.

CLI commands can vary in complexity depending on their usage and the parameters required to execute the CLI commands. Some CLI commands may require one or more input parameters which may be derived from the output of previously-executed commands A CLI command includes a command name, one or more sub-commands, and/or parameters or arguments. A parameter has zero or more parameter values.

An exemplary CLI is the Azure® command line interface for the Microsoft® Azure® cloud computing service. This cloud computing service provides various services, such as software-as-a-service (Saas), platform-as-a-service (PaaS), and infrastructure-as-a-service (IaaS) to build, test, deploy, and manage services and applications in addition to providing different programming tools. It should be noted that the techniques described herein are not limited to this particular CLI or to a particular configuration of a CLI interface.

In order to perform an operation in the CLI-based application 104, a user would need to know what CLI command to use, the correct format of the command, the parameters needed for the command, and the associated parameter values. The correct usage of a CLI command refers to the format of the text string of an operation that includes the command, subcommands, parameters and/or parameter values needed to execute the operation. If a required parameter is not entered with the correct parameter value, execution of the command would likely cause an error. The user would have to find the correct usage of the command and correct the error. This process would have to be repeated for each error encountered with a CLI command until every error is corrected.

In order to assist the user in knowing the correct format for a command, the user may seek assistance from the CLI-based application. As shown in FIG. 1, a user may issue the command az keyvault update -h. The az keyvault update command is used to update the properties of a keyvault. A keyvault is a mechanism that stores and controls access to tokens, passwords, certificates, API keys, and other secrets. The command is az keyvault and update is a subcommand. The parameter -h is a request for help with the command. The command is sent to the cloud service which has an example generator 116. The example generator 116 generates an example based on the command and subcommand which is returned back to the user. As shown in FIG. 1, the example 118 consists of an explanation of the command 120 and an example of its usage 122.

Figure 2:
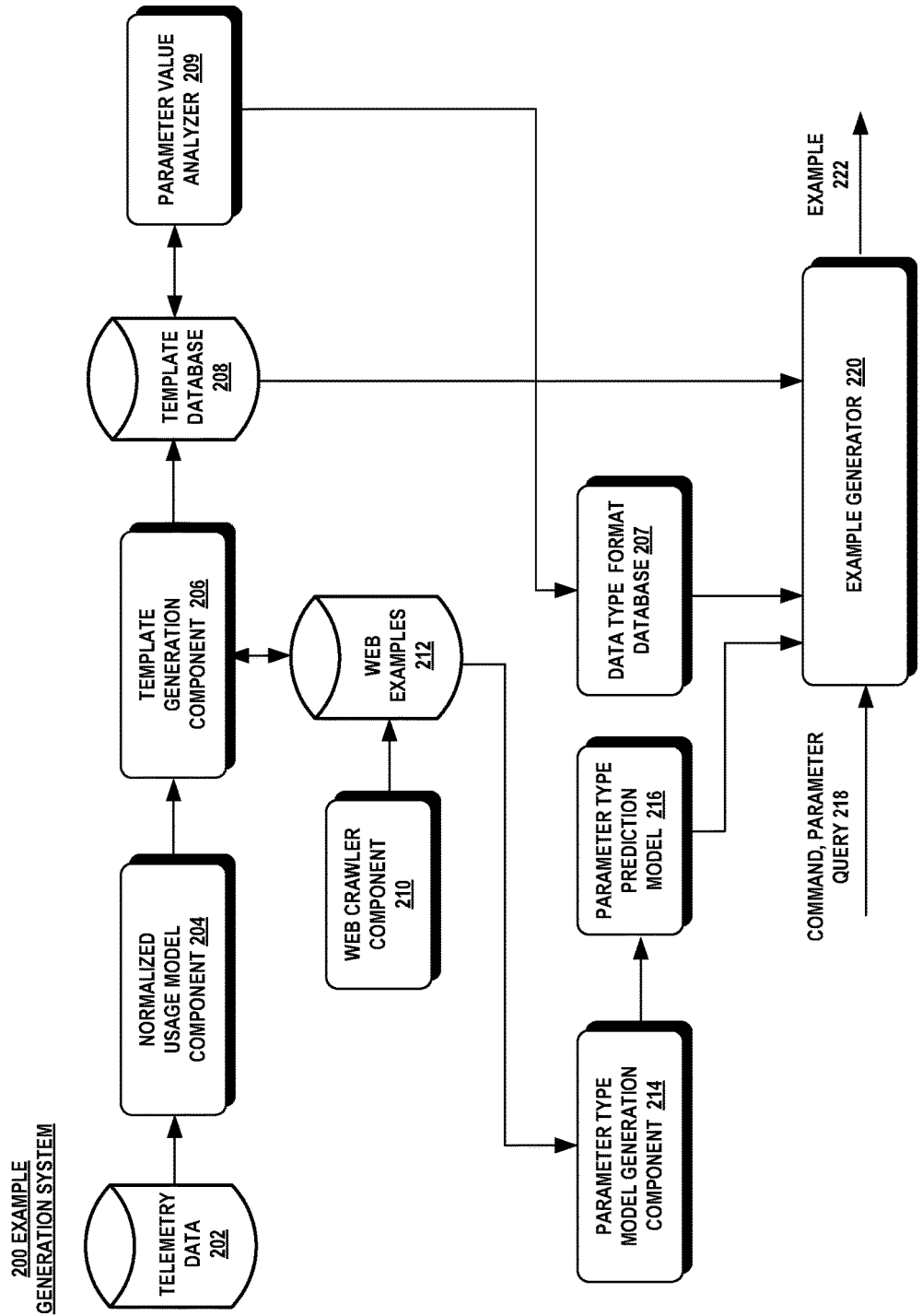
FIG. 2 is an exemplary configuration of the components of an example generation system.

Attention now turns to a description of a system 200 for generating CLI command usage examples. Turning to FIG. 2, initially, templates are generated including examples of the correct usage of a CLI command taken from telemetry data 202. The telemetry data 202 is obtained from monitoring the production usage of the CLI-based application. The telemetry data 202 includes commands that have been successfully executed with a correct set of parameters and those that have failed. The telemetry data 202 does not include parameter values due to privacy concerns.

The normalized usage model component 204 eliminates from the telemetry data 202 the command data of failed attempts and obtains pairs of command/parameter that have been successfully executed. The normalized usage model component 204 tracks the number of users that have executed each command/parameter pair. The most frequently-used sets of parameters are selected for each command. The most frequently-used sets of parameters for each command are limited to a threshold number. A set of parameters may include zero or more parameters. The template generation component 206 generates a template for the selected paired command and parameter which are stored in the template database 208. Placeholders are inserted for the parameter values of the parameters.

In order to generate parameter values for each of the command/parameter pairs, parameter values are obtained from usage examples from publicly-accessible sources. The usage examples may come from publicly-accessible source code repositories, such as GitHub, from online documentation, and from websites containing command usage examples, such as Stackoverflow.com and other knowledge market websites. A usage example contains a command, a set of parameters, and parameter values for each of the parameters in the parameter set.

A web crawler component 210 is used to obtain publicly-accessible examples of the CLI commands which include parameters and parameter values in addition to the corresponding command. These web examples are then used by the template generation component 206 to add in parameter values for each of the command/parameter pairs in the template database 208. For some commands, there may be multiple parameter values for a parameter and for other commands, there may not be any parameter values for a parameter. For those commands where there are multiple values for a parameter, a machine learning model is used to determine the data type associated with a paired command/parameter in order to select the correct parameter value from the multiple values. For those commands, where there are no parameter values, the machine learning model generates a parameter value consistent with the predicted data type. The machine learning model or parameter type prediction model 216 is trained by the parameter type model generation component 214 using features extracted from the web examples 212.

There may be multiple parameter values for a particular parameter data type. In order to identify the most appropriate parameter value, a data type format is used. The data type format is the format of the text string corresponding to the most appropriate parameter value. For example, for the data type, IP Address, a template may contain the parameter values "MyIPAddress", "ip", "0.0.0.0". The data type format for an IP Address data type may be a regular expression that indicates four integer values separated by periods or eight integer values separated by a colon. In this case, the parameter value "0.0.0.0" is selected. By way of another example, a regular expression may be one of "mm/dd/yy", "2020/mm", or "yy/dd/mm" which is used to find the date of a parameter value having a date data type.

The data type format for a particular data type is stored in the data type format database 207. The data type format is pre-configured and may be set in advance to a particular format to achieve an intended objective or may be derived by the parameter value analyzer 209. The data type format is represented by a regular expression that can specify a single value, a range of values, or a particular character string.

The parameter value analyzer 209 generates the data type format based on the frequency that a data format is found in the web examples. For example, for a parameter data type that is an integer, the value '0' is found in 90% of the web examples and the value '1' is found in 10% of the web examples. The parameter value analyzer 209 may generate a regular expression that indicates a single value of '1' as the integer parameter value for the example. The parameter value analyzer 209 may also generate a regular expression that indicates a range of values. A range of values, such as (−1, 0, 1) may also be used to select a parameter value where the range of values is derived from the frequency of usage in the web examples.

An example generator 220 receives a request for an example of the usage of a particular command/parameter pair. The example generator 220 obtains the corresponding template for the request. When there are multiple parameter values for a parameter, the parameter type prediction model 216 is used to infer a data type which is used to select the appropriate parameter value for the parameter. In the case where there are not any parameter values for a parameter, the parameter type prediction model 216 is used to generate a parameter value consistent with the predicted data type. The output of the example generator 220 is an example 222 generated from the template.

Figure 3:
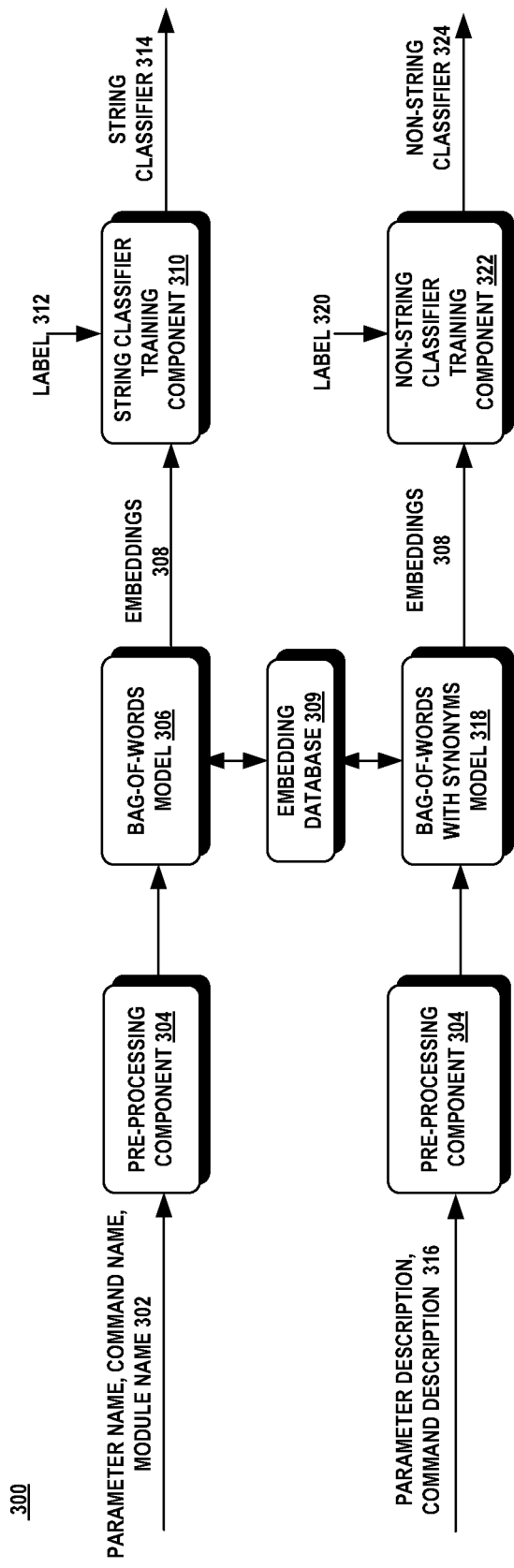
FIG. 3 is an exemplary configuration of the parameter type prediction model training phase.

Attention now turns to a description of the components used to train the parameter type prediction model. Turning to FIG. 3, the parameter type prediction model is composed of a string classifier 314 and a non-string classifier 324. The string classifier 314 is used to classify input features associated with a string data type and the non-string classifier 324 is used to classify input features associated with a non-string data type. The string classifier 314 is trained with embeddings 308 generated from a bag-of-words machine learning model 306 and the non-string classifier 324 is trained with embeddings 308 from a bag-of-words-with-synonym machine learning model 318.

A data type or type is a particular kind of data item that is defined by the values that the data item can represent in the command line interface. For example, in Azure CLI, the data types include string, enum, identifier (Id), IP-address, integer (int), integer with format, version, time, duration, link, email, file, folder path, quoted strings, permission formats, build information, keys and tokens. Strings are a more commonly-used data type than the other data types in this CLI thereby making the training datasets for the classifiers imbalanced. In order to compensate for this imbalance, the string classifier is used to classify a string type and the non-string classifier is used to classify non-string types, such as enum, identifier (Id), Internet Protocol (IP)-address, integer (int), integer with format, date, version, time, duration, link, email, file, folder path, quoted strings, permission formats, build information, keys and tokens.

The classifiers are trained with embeddings representing features extracted from the web examples. In one aspect, the features include parameter name, command name, module name, parameter description, and command description. The parameter name, command name and the module name come from the source of the web example and the parameter and command description come from the documentation of the CLI. This documentation may include an online manual, blog, etc. The parameter name is the long name of the parameter, the command name is the name extracted from the example, the module name is the name of the module (e.g., source code file) from which the example was extracted, the parameter description is the description of the parameter from related documentation, and the command description is the description from related documentation.

Turning to FIG. 3, the parameter type prediction model training 300 consists of extracting features from the web examples and descriptions of the command names and parameter names. The parameter name, command name, and module name of an example 302 are pre-processed by a pre-processing component 304 and then input into a bag-of-words (BOW) model 306. The parameter description and command description 314 are pre-processed by the pre-processing component 304 and then input into a bag-of-words-with-synonym (BOWS) model 318. The pre-processing component 304 transforms the text into lower-case characters, removes all special characters, and common stop words. The resulting words are then lemmalized using WorldNet lemmanizer. Lemmatization refers to the removal of inflectional endings and returning the base of the word to its lemma.

The BOW model 306 is an encoder that produces a numerical representation of the input words representing their frequency of occurrence in the training dataset disregarding the semantic relationship between the words. The BOWS model 318 is an encoder that produces a numerical representation of the input words representing the frequency of occurrence in the training dataset considering synonyms. The command descriptions and the parameter descriptions contain several sentences with a lot of variation in word usage. For this reason, the BOWS is used to avoid sparsity issues. The embeddings produced from the BOW and BOWS are stored in an embedding database 309.

In one aspect, the word frequency used in the BOW/BOWS encoders is replaced with a Term Frequency-Inverse Document Frequency (TF-IDF) score which applies a weighted average to each word that measures the relevance of the word rather than its frequency. TF-IDF is a function that assigns a weight for each word in a document based on the frequency the word appears in the document. A word has a higher weight if it is used often but if the word is used too frequently, the weight applies a penalty to the word embedding. Each word's TF-IDF score is normalized into an embedding and then input into a respective classifier.

The string classifier training component 310 receives the embeddings 308 and an associated label 312 and trains a string classifier mode 1314. Similarly, the non-string classifier component 322 receives each embedding with its associated label 320 and trains a non-string classifier model 324.

In one aspect, the classifiers are a random forest classifier. A random forest is an ensemble-based machine learning technique for classification. This technique is constructed using multiple decision trees that are trained to produce a probability representing a classification or label identifying the class that represents the mode of the classes of the decision trees. A mode is the value in the training dataset that appears most frequently.

A random forest model M consists of a fixed number of decision trees, T, that vote to predict a classification on unseen data. Each decision tree consists of a root node, multiple internal nodes referred to as split nodes, and multiple leaf nodes. Each root and split node of each tree performs a binary test on each input training data or feature vector and performs a binary test and based on the result, directs the data to the left or right child node. The leaf nodes store a probability distribution.

Each node in a decision tree i provides a probability $p_i$ (y|x) for each y∈L, which is obtained during training the random forest, where y is a label out of the available labels L, and x represents a feature vector of n features. The label is the data type. The final classification is obtained from a vote of all the trees, T, and the resulting label is assigned according to the following equation:

$$M(x) = \mathrm{argmax}_{y \in L} \frac{1}{T} \sum_{i=1}^{T} p_i(y \mid x).$$

This method of combining trees is an ensemble method. The individual decision trees are weak learners and the ensemble produces a strong learner. Decision trees can suffer from over-fitting which leads to poor generalization and a higher error rate. An ensemble of decision trees, such as a random forest, improves generalization. A more detailed description is provided below.

Figure 4:
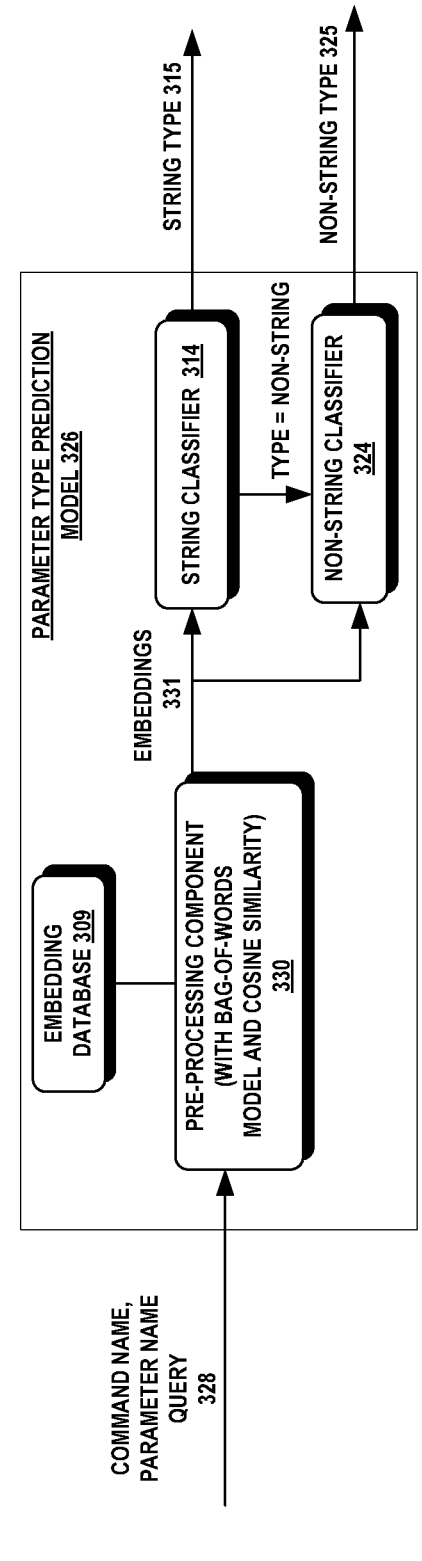
FIG. 4 is an exemplary configuration of the inference phase of the parameter type prediction model.

Attention now turns to the inference phase 340 of the parameter type prediction model. Turning to FIG. 4, there is shown the components used to infer or predict a parameter data type using the parameter type prediction model 326. The goal of the parameter type prediction model 326 is to find a type that is the same or which closely resembles the command name and parameter name of the query 328. The query 328 includes a command name and parameter name. The parameter name corresponds to a parameter used with the command name.

The command name and parameter name of the query 328 is processed by a pre-processing component 330 that includes pre-processing functions, a bag-of-word model, and a cosine similarity function. The pre-processing component 330 transforms the text of the query 328 to lower case letters, removes special characters and stop words, and generates lemmas. The remaining words are encoded into an embedding through a bag-of-words model. The pre-processing component 330 uses the embedding to find a similar embedding from the previously-generated embeddings in the embedding database 309 using cosine similarity. Cosine similarity is a measure of similarity between two non-zero vectors or embeddings by measuring the cosine of the angle between the two embeddings.

The resulting embedding is input into the string classifier 314 which generates a probability indicating whether the command name and parameter name is associated with a string type 315. If the command name and parameter are not associated with a string type, the embedding is transmitted to the non-string classifier 324 which indicates the non-string type 325 associated with the input query 328.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
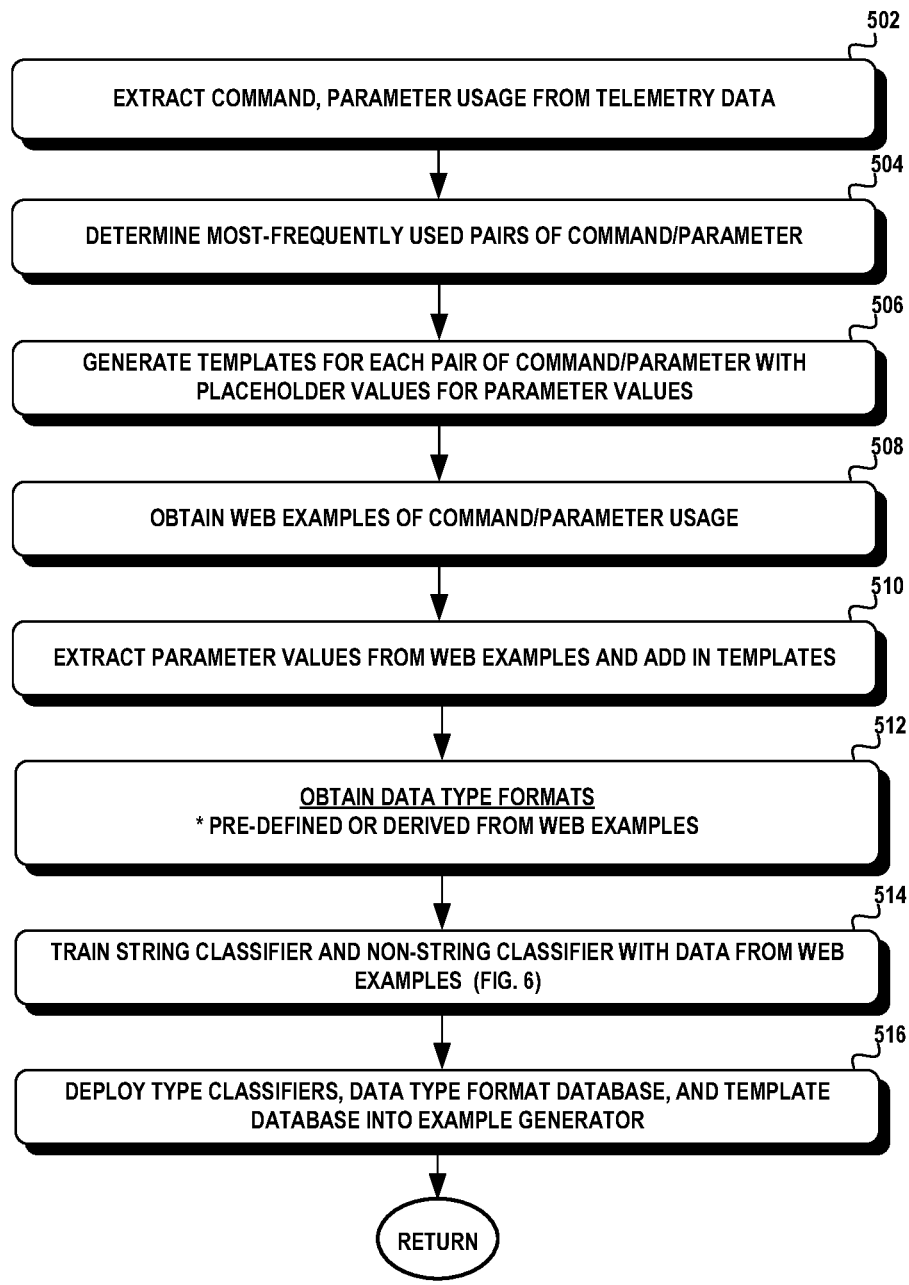
FIG. 5 is a flow diagram illustrating an exemplary method for generating examples for a CLI-based application.

Attention now turns to an exemplary process 500 for generating examples for command line commands. Turning to FIGS. 2 and 5, telemetry data 202 is obtained from monitoring the production usage of the CLI-based application. The telemetry data 202 includes commands that have been successfully executed with a correct set of parameters and those that have failed. The telemetry data 202 does not include parameter values (Collectively, block 502).

The most frequently-used pairs of command and parameter are determined from the telemetry data 202. The normalized usage model component 204, eliminates from the telemetry data 202, the data of failed commands and obtains pairs of commands and parameters that have been successfully executed. The normalized usage model component 204 tracks the number of users that have executed each command/parameter-set pair. The most frequently-used sets of parameters are selected for each command. The most frequently-used sets of parameters for each command are limited to a threshold number. (Collectively, block 504).

The template generation component 206 generates a template for the selected command/parameter pair which is stored in the template database 208. Placeholders are inserted for the parameter values of the parameters. (Collectively, block 506).

Examples of command and parameter usage is obtained from various web sites. A web crawler component 210 is used to obtain publicly-accessible examples of the CLI commands which includes parameters and/or parameter values. (Collectively, block 508).

Parameter values are extracted from the web examples and input into a corresponding template. For some commands, there may be multiple parameter values for a parameter and for other commands, there may not be any parameter values for a parameter. (Collectively, block 510).

A data type format is generated for each parameter type. The data type format may be a regular expression that represents a range of values, a single value, or a character string. The data type format may be pre-defined, derived from the web examples or a combination thereof. The parameter value analyzer 209 analyzes the frequency of the parameter values found in the web examples and derives a regular expression of the most frequently-occurring data format. Alternatively, predefined type formats may be generated without the use of the parameter value analyzer 209. The data type formats are stored in the data type format database 207 (block 512).

The string classifier and the non-string classifier are trained with the data from the web examples (block 514). Upon completion of the training of the string and non-string classifiers, the classifiers, data type formats, and the template database are deployed in an example generator 220 (block 516).

Attention now turns to an exemplary method for training the parameter type prediction model. The parameter type prediction model consists of multiple classifiers with each classifier used for a particular data type of a parameter value. In one aspect, there is a string classifier used to predict string parameter types and a non-string classifier used to predict all other parameter types other than a string data type. In one or more aspects, the string classifier and the non-string classifiers are random forest classifiers.

Figure 6:
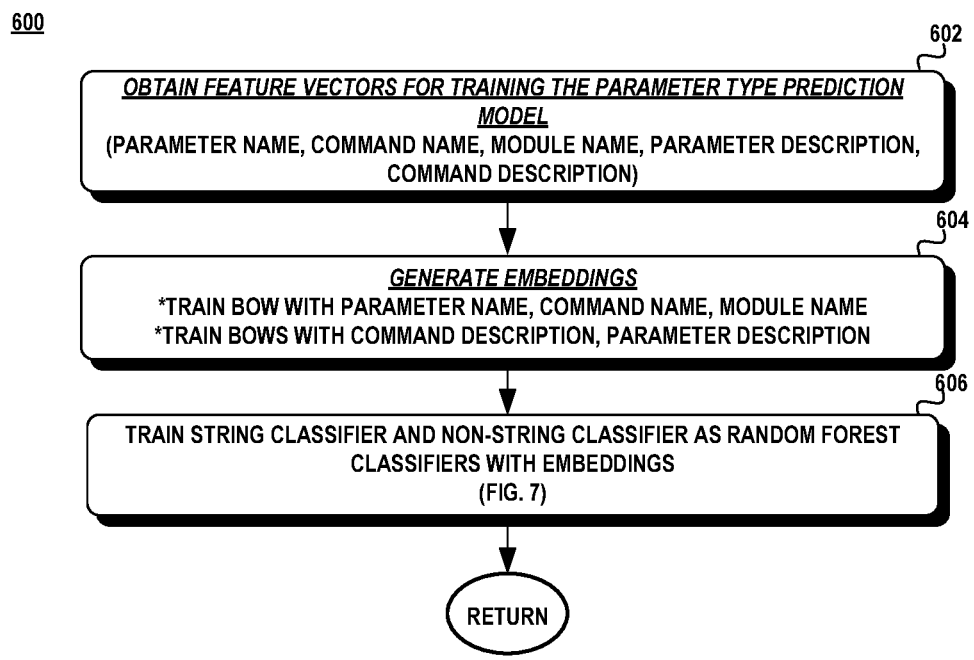
FIG. 6 is a flow diagram illustrating an exemplary method for training the parameter type prediction model.

Turning to FIG. 6, features are extracted from the web examples 212. The extracted features may include the command name, the parameter name, the module name of the source, the command description and the parameter description. (Collectively, block 602).

A bag-of-words model is trained with the command name, parameter name, and the module name to generate embeddings and the command description and the parameter description is used to train a bag-of-words-with-synonym model to generate additional embeddings (block 604). The embeddings are then used with appropriate labels to train a string classifier and a non-string classifier. (Collectively, block 606).

Figure 7:
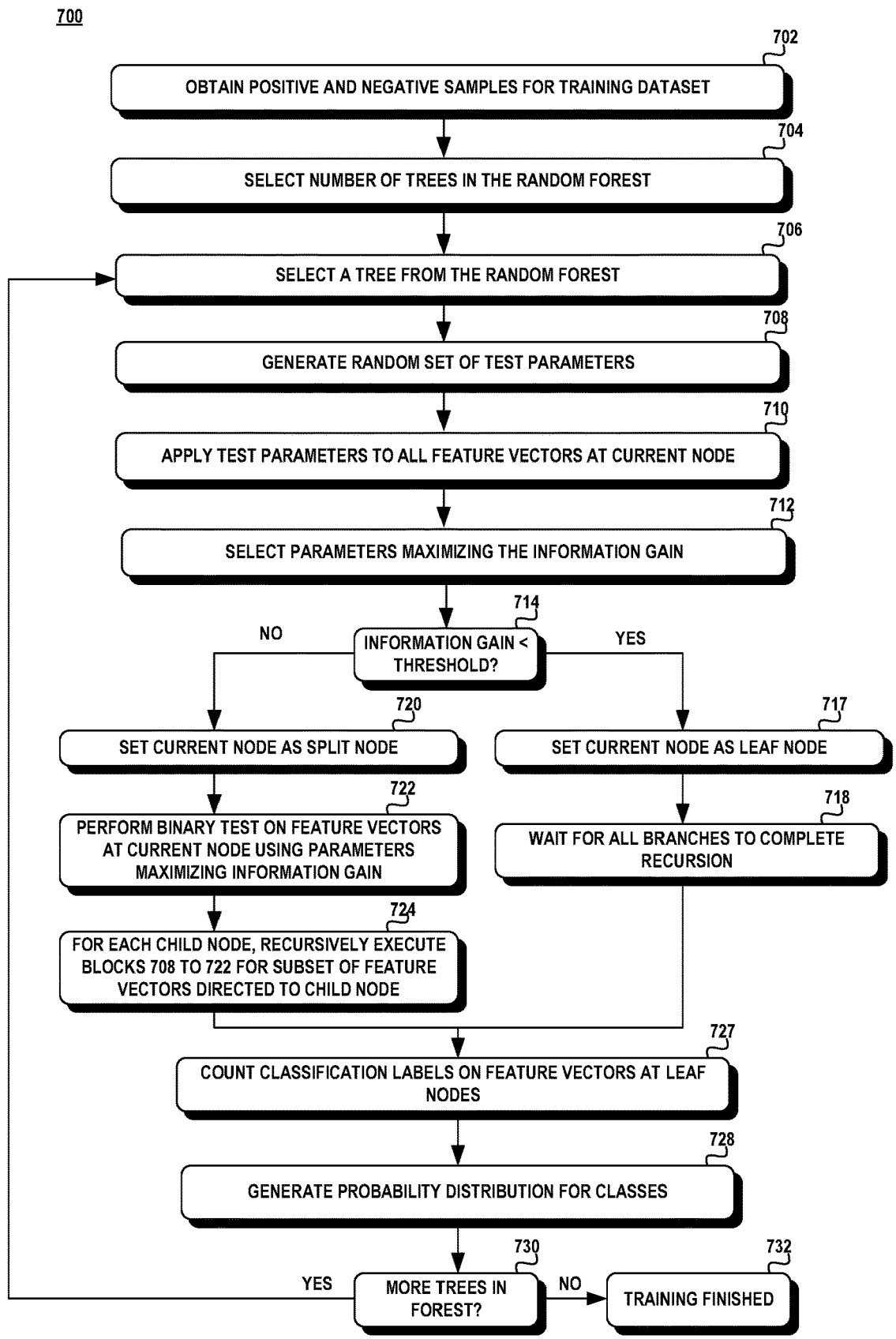
FIG. 7 is a flow diagram illustrating an exemplary method for training a random forest classifier as the string classifier and the non-string classifier.

FIG. 7 illustrates an exemplary process for training a random forest classifier which is done for the string classifier and the non-string classifier. Turning to FIG. 7, the training dataset for a classifier which includes positive and negative samples is obtained. For both classifiers, the positive samples are feature vectors representing features associated with a parameter type of a string and the negative samples are feature vectors representing features associated without a parameter type that is other than a string (Collectively, block 702).

Initially, the number of trees for each random forest is pre-configured to a particular number (block 704). The process starts by selecting a decision tree from the random forest (block 706). A random set of test parameters are then generated for use by the binary tests performed at the root node (block 708).

The binary test is of the form: $\alpha > f(x; \theta) > \beta$, such that $f(x; \theta)$ is a function applied to a feature vector x with parameters $\theta$, and with the output of the function compared to threshold values $\alpha$ and $\beta$. If the result of $f(x; \theta)$ is in the range between $\alpha$ and $\beta$ then the result of the binary test is true. Otherwise, the result of the binary test is false. The result of the binary test performed at a split node determines which child node a feature vector is passed to. (Collectively, block 710).

The random set of test parameters generated comprise a set of random values for the function parameter $\theta$ and the threshold values $\alpha$ and $\beta$. The function parameters of $\theta$ of each split node are optimized over a subset $\theta$ of all possible parameters. Then, every combination of a test parameter is applied to each feature vector. For each combination, the information gain is calculated. The combination of parameters that maximizes the information is selected and stored at the current node for further use. (Collectively, block 712).

Next, it is determined whether the value for the maximized information gain is less than a threshold (block 714). If the value for the information gain is less than the threshold (block 714—yes), then this indicates that further expansion of the tree does not provide significant benefit and the current depth of the tree is determined. If this is greater than a predefined maximum value, then the current node is set as the leaf node (block 716) and the process waits for all branches to complete recursion (block 718).

If the value for the maximized information gain is greater than or equal to the threshold (block 714—no), and the tree depth is less than the maximum value, then the current node is set as a split node (block 720).

As the current node is a split node, it has child nodes, and the process then moves to training these child nodes. Each child node is trained using a subset of the feature vectors at the current node. The subset of feature vectors sent to a child node is determined using the parameters that maximize the information gain. These parameters are used in the binary test, and the binary test performed on all feature vectors at the current node (block 722). The feature vectors that pass the binary test form a first subset sent to a first child node, and the feature vectors that fail the binary test form a second subset sent to a second child node.

For each of the child nodes, the process shown in blocks 708 to 722 is recursively executed for the subset of feature vectors directed to the respective child node. In other words, for each child node, new test parameters are generated, applied to the respective subset of feature vectors, parameters maximizing the information gain selected, and the type of node is determined. If it is a leaf node, then the current branch of recursion ceases. If it is a split node, binary tests are performed (block 722) to determine further subsets of feature vectors and another branch of recursion starts. Therefore, this process recursively moves through the tree, training each node until leaf nodes are reached at each branch. As leaf nodes are reached, the process waits until the nodes in all branches have been trained (block 718).

Once all the nodes in the tree have been trained to determine the parameters for the binary test maximizing the information gain at each split node, and leaf nodes have been selected to terminate each branch, the probability distribution can be determined for all the leaf nodes of the tree (block 726). This is achieved by counting the class labels of the feature vectors that reach each of the leaf nodes (block 728). All the features from the feature vectors end up at a leaf node of the tree.

Once the probability distribution has been determined for the leaf nodes of the tree, then if more trees are present (block 730—yes), the process repeats. If all the trees in the forest have been trained (block 730—no), then the training process is complete (block 732). Hence, the training process generates multiple decision trees trained using the training dataset. Each tree comprises multiple split nodes storing optimized test parameters and leaf nodes storing associated probability distributions.

Figure 8:
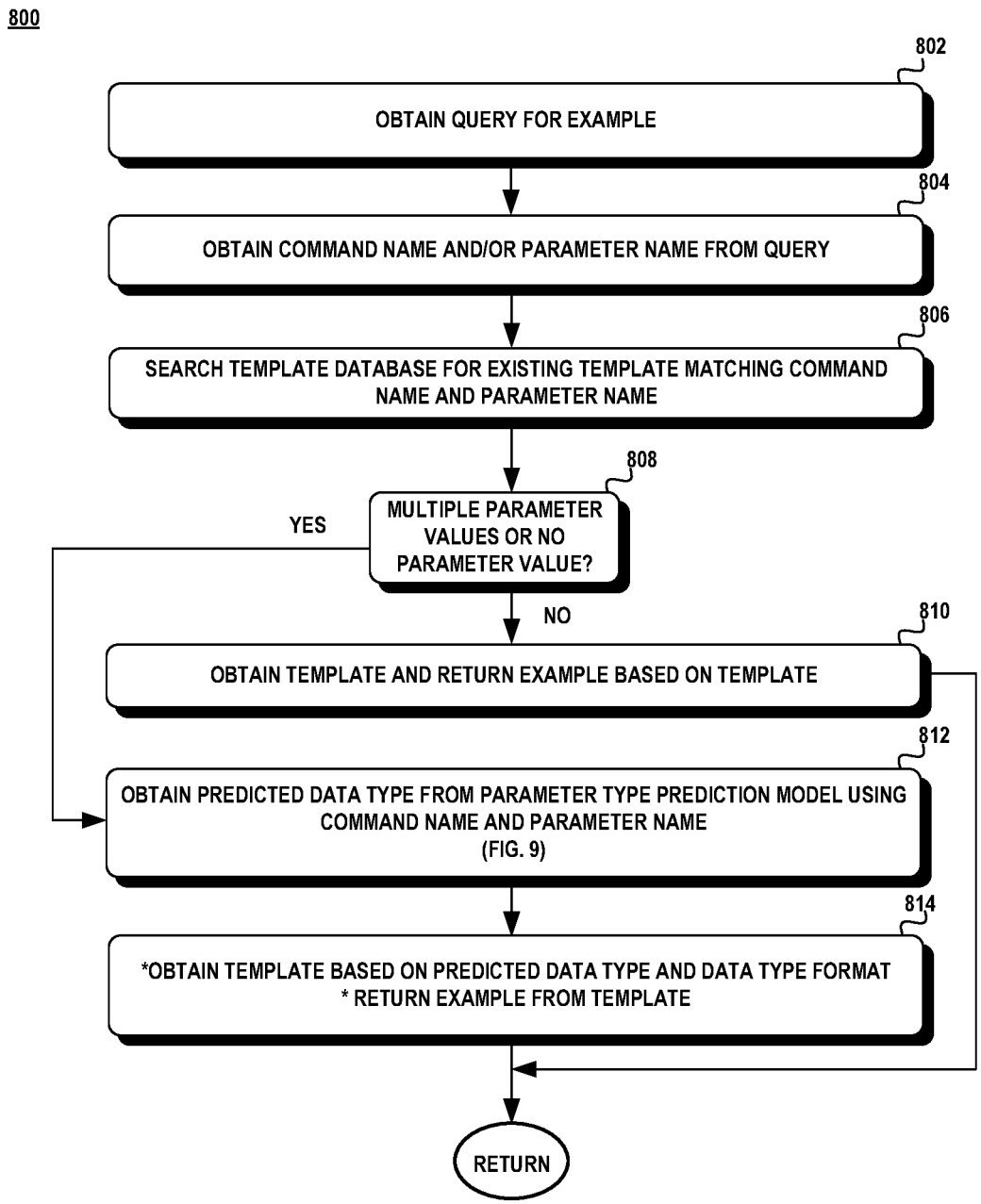
FIG. 8 is a flow diagram illustrating an exemplary method for generating an example for a command and parameter having parameter values.

Attention now turns to the process 800 of generating an CLI example. Referring to FIGS. 2 and 8, the example generator 220 receives a query 218 for an example of the usage of a particular command name with a parameter. The query 218 may be issued in a natural language or requested within the CLI. For example, ~$az keyvault update -h is a request for help using the az keyvault update command. The command uses the -h or help option after the command name. Another example is ~$az find 'ssh' which uses the find command to find examples of the topic ssh. (Collectively, block 802).

The command name and the parameter name are extracted from the query (block 804). The template database is searched for an existing template matching the command name and parameter name (block 806). If there are no multiple parameter values or no parameter value (block 808—no), then the parameter value in the template is used to generate an example which is returned to the requestor (block 810).

Otherwise, if there are multiple parameter values and no parameter value for the request (block 808—yes), then the parameter type prediction model is used to generate a predicted type (block 812). The predicted type is then used to select a parameter type from the template database in the case where there are multiple parameter types or to generate a parameter value based on the predicted type (block 814). An example is generated from the template using the predicted parameter value and returned to the requestor (block 814).

For example, if the non-string classifier identifies the parameter type as IP-Address, the regular expression 'dd.ddd.dd.dd' is the data type format, the values in the template are ['MyIpAddress', '$ip', '10.240.40.50'], then the string '10.240.40.50' would be selected as the appropriate parameter value.

Figure 9:
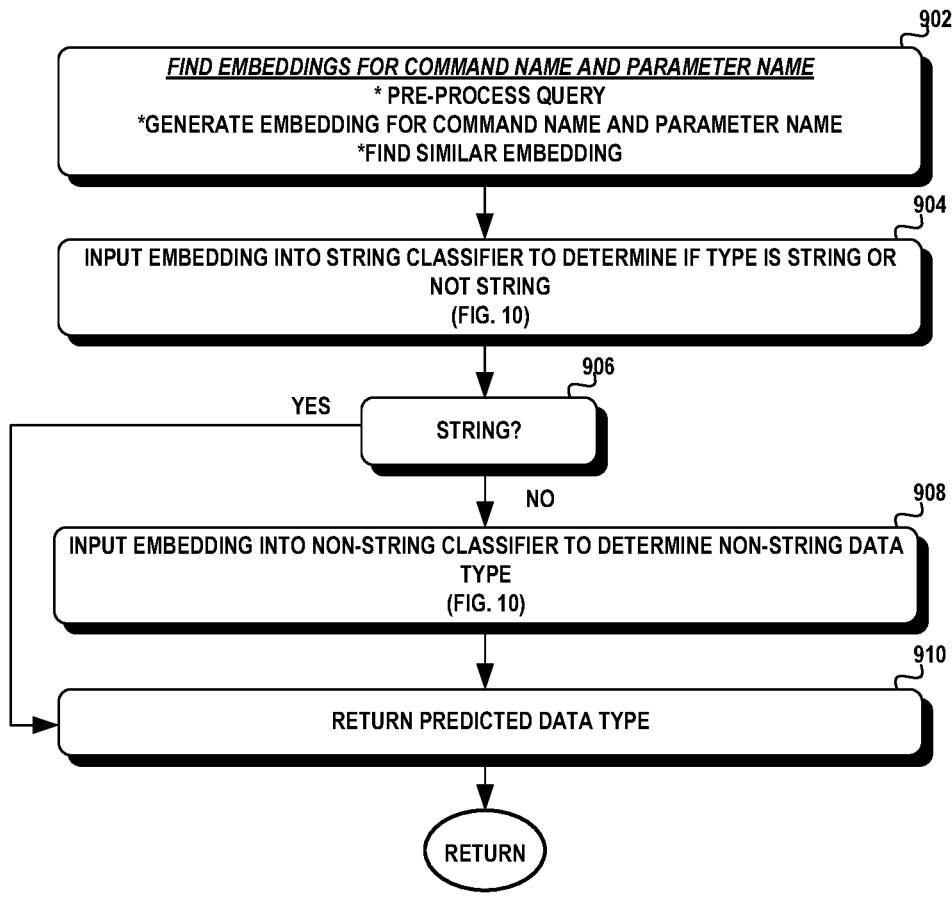
FIG. 9 is a flow diagram illustrating an exemplary method for obtaining a parameter data type from the parameter type prediction model.

Attention now turns to the use of the parameter type prediction model to predict the data type of a parameter. Turning to FIGS. 4 and 9, embeddings are generated for the command name and the parameter name using the BOW model of the pre-processing component 330 (block 902). The command name and parameter name are pre-processed to transform the text into lower-case characters, to eliminate stop words, remove special characters, and to lemmanize the words. A cosine similarity function is used to find similar embeddings 331 from the embedding database 309 to the ones generated for the query text string 328. (Collectively, block 904).

The similar embeddings 331 are input into the string classifier 314 to predict if the data type is a string type 315 or not a string type. The output of the string classifier 314 is a probability which is used to indicate whether the data type associated with the command name and parameter name is likely to be a string type or not a string type. (Collectively, block 904).

If the output of the string classifier indicates that the query is likely to be associated with a string type for a parameter value (block 906—yes), then the predicted data type is used to select a parameter value of the same type from the template database or generate a parameter value of the predicted type (block 910).

If the output of the string classifier indicates that it is likely that the query is not associated with a string type (block 906—no), then the embeddings 331 are input into the non-string classifier (block 908). The non-string classifier generates a probability distribution for each of the non-string data types (block 910). The non-string data type having the highest probability is the predicted type and used to select a type from the template database or generate such a type (block 910).

Figure 10:
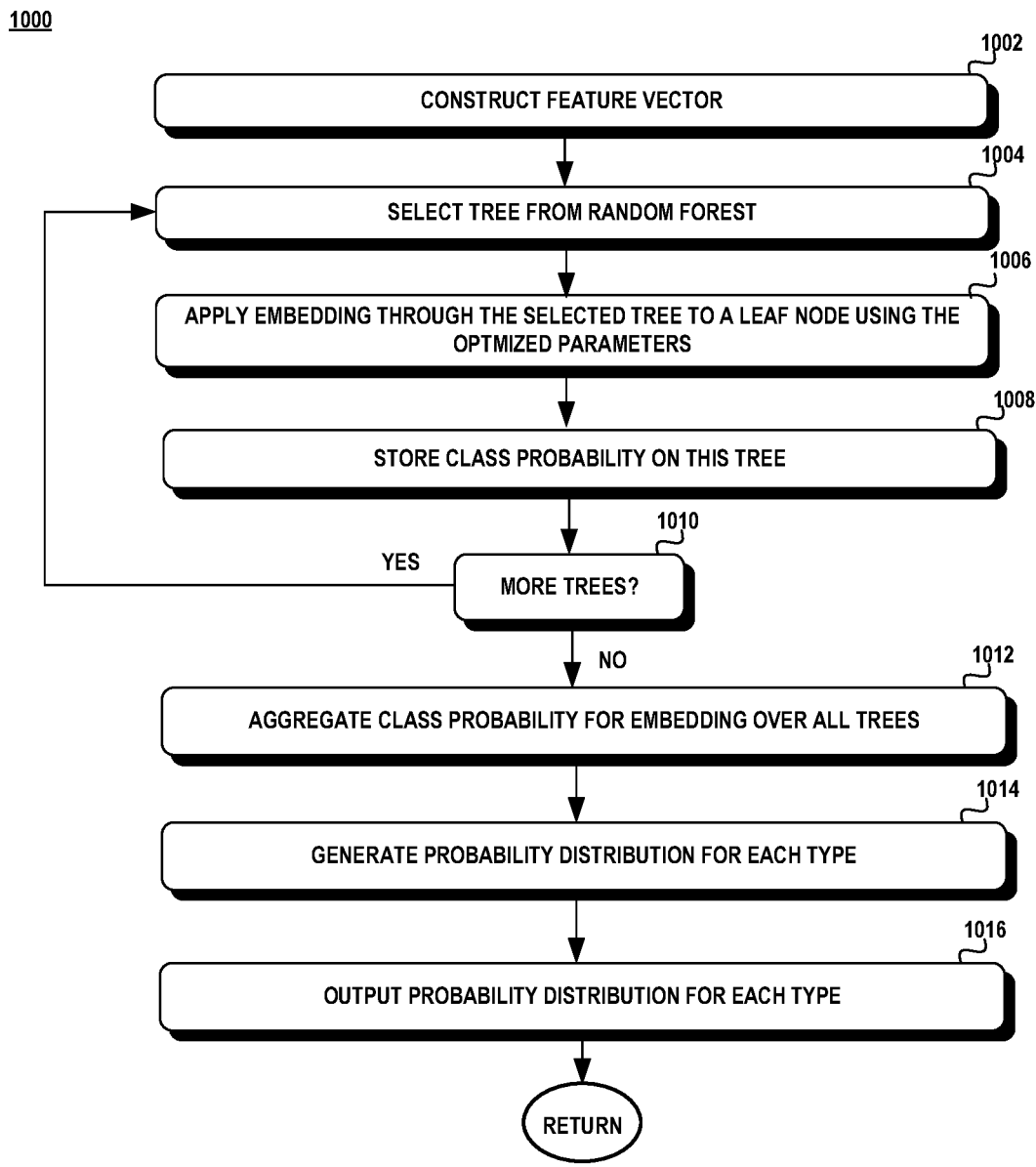
FIG. 10 is a flow diagram illustrating an exemplary method for classifying input feature vectors as a parameter data type.

Attention now turns to the use of the random forest classifiers in inferring the type of the parameter value. Turning to FIG. 10, there is shown an exemplary method 1000 for predicting the data type of parameter value using one or more machine learning models. The embeddings generated from the command name and parameter name form a feature vector for a respective model. (Collectively, block 1002).

The feature vector is applied to each tree in the random forest for classification. A trained decision tree from the random forest is selected (block 1004) and is tested against the trained and optimized parameters in each binary test in each node (block 1006). Based on the result of the test, the feature vector is passed to the appropriate child node (block 1008). The process is repeated until the feature vector reaches a leaf node (block 1010). Once the feature vector reaches a leaf node, the probability distribution associated with this leaf node it stored for this feature vector (block 1012).

If there are more decision trees in the random forest (block 1014—yes), a new decision tree is selected (block 1008). The feature vector is pushed through the tree (block 810) and the probability distribution stored (block 1012). This is repeated until there are no more decision trees in the random forest (block 1014—no). Once the feature vector has been applied to each tree in the random forest (block 1014—no), then the stored probability distributions that have been stored are aggregated (block 1016) to form the overall probability distribution for each class (block 1018). The overall probability distribution for each class is then output (block 1020). In the case of the string classifier, there is one class which is the string type and the output will indicate the probability that the input features represent a string. In the case of the non-string classifier, there are multiple classes with each class representing each of the data types in the CLI. Each class or data type is associated with a particular probability indicating the likelihood that the input features represent the class.

Attention now turns to exemplary systems that embody the example generation system. In one aspect, the example generator may be embodied in a cloud service that utilizes a CLI-based application. The example generator is used by users (e.g., developers, customers, clients) of the CLI-based application 104 to learn the correct usage of a command of the CLI. As shown in FIG. 1, a user device 106 is connected to a cloud server 108 through a network 110. The user device 106 contains a web browser or rich client application 112 having the CLI interface 102. The CLI interface 102 may contain a natural language interface that enables the user to query the example generator for examples. The CLI interface 102 may also contain search and/or find commands that a user utilizes to obtain examples on the usage of a particular command from the example generator.

Figures 11A, 11B:
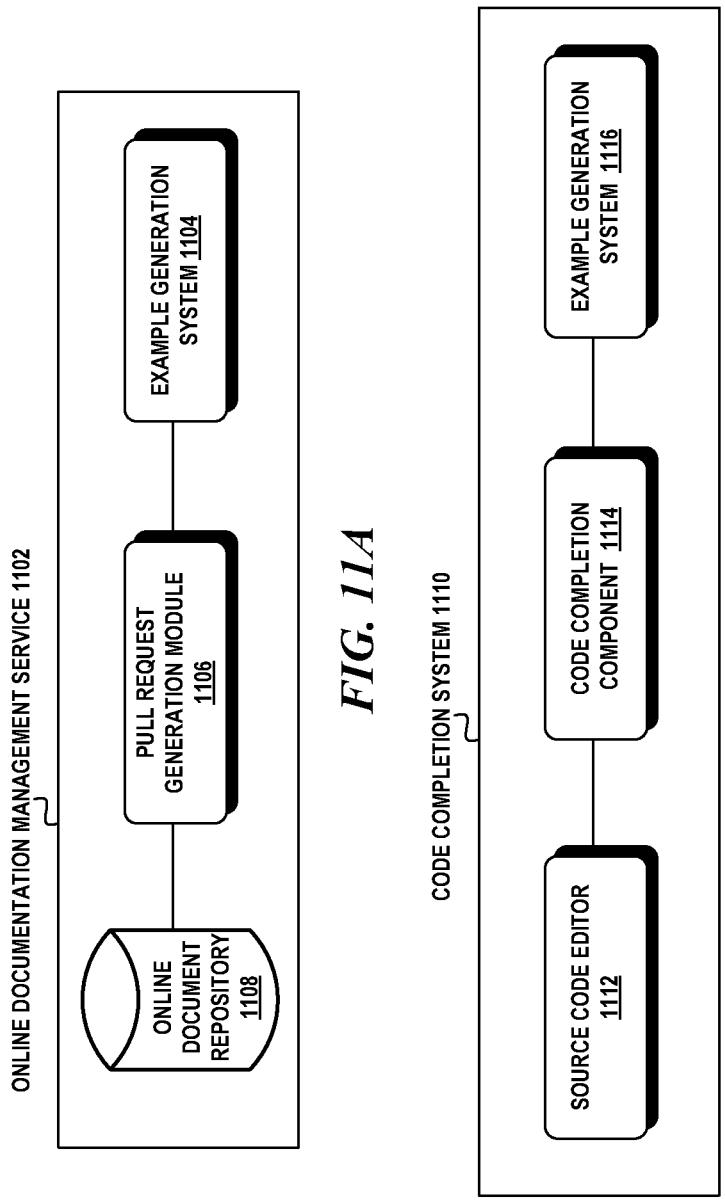
FIG. 11A is an exemplary illustration of the usage of the example generator in an online documentation management service and FIG. 11B is an exemplary illustration of the usage of the example generator in a code completion system.

In another aspect, the example generation system may be embodied in an online documentation management service. Turning to FIG. 11A, the online documentation management service 1102 manages the online documentation of the CLI. As new and updated commands, parameters, and parameter values are added to the CLI, the online documentation management service 1102 updates the online documentation at each update cycle using the example generation system 1104 to provide examples for the new and updated commands. The online documentation management service 1102 contains a pull request generation module 1106 that interacts with an online document repository 1108 and the example generation system 1104. The pull request generation module 1106 inserts examples generated by the example generator 1104 at each update cycle by submitting pull requests to include the updated examples into the online documentation repository 1108.

In yet another aspect, the example generator may be part of a code completion system. Code completion is an automatic process of predicting the rest of a code fragment as the user is typing. Code completion speeds up the code development time by generating candidates to complete a code fragment when it correctly predicts the parameter value after a few characters have been typed. Code completion may be a function or feature integrated into a source code editor and/or integrated development environment (IDE). Code completion may be embodied as a tool or feature that can be an add-on, plug-in, extension and/or component of a source code editor and/or IDE.

Turning to FIG. 11B, the code completion system 1110 may include a source code editor 1112, a code completion component 1114, and the example generation system 1116. The source code editor 1112 may include a user interface and a parser. The user interface includes a set of features or functions for writing and editing a CLI script. The user interface may utilize a pop-up window to present a list of possible candidates for completion thereby allowing a developer to browse through the candidates and to select one from the list.

The parser reads the CLI code in the source code editor 1112 to detect that the user has entered a particular input or marker character which will initiate the code completion component 1114. In one aspect, the character string '--" is used to detect a parameter and the term after the parameter initiates code completion for a parameter value. The code completion component 1114 requests candidate parameter values from the example generation system 1116 for the command name and parameter name preceding marker character. The example generation system 1116 generates the candidates which are returned back to the source code editor and displayed in the user interface for the developer. The developer is able to select a candidate parameter value which is then entered into the CLI code.

Exemplary Operating Environment

Figure 12:
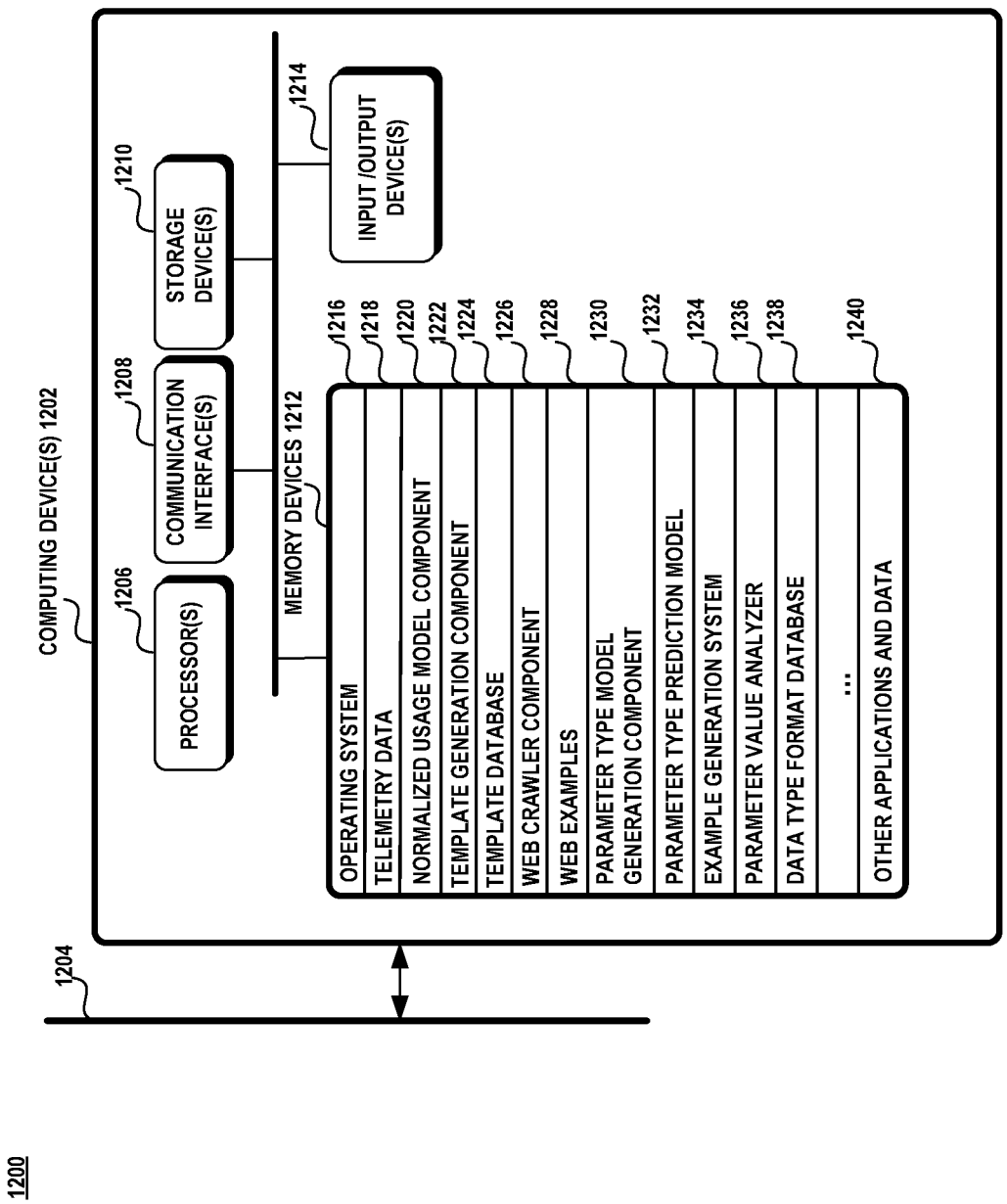
FIG. 12 is a block diagram illustrating an exemplary operating environment.

Attention now turns to a discussion of an exemplary operating environment. FIG. 12 illustrates an exemplary operating environment 1200 used to generate examples for command-line commands. The operating environment 1200 may be configured as a cloud service having multiple computing devices or configured as a single computing device. The computing devices 1202 are coupled to a network 1204 to other computing devices. However, it should be noted that the aspects disclosed herein is not constrained to any particular configuration of devices and that other configurations are possible.

A computing device 1202 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 1200 may be configured in a network environment, a distributed environment, a multi-processor environment, or a stand-alone computing device having access to remote or local storage devices.

A computing device 1202 may include one or more processors 1206, one or more communication interfaces 1208, one or more storage devices 1210, one or more input/output devices 1214 and one or more memory devices 1212. A processor 1206 may be any commercially available or customized processor and may include dual microprocessors and multi-processor architectures. A communication interface 1208 facilitates wired or wireless communications between the computing devices and other devices.

A storage device 1210 may be computer-readable medium that does not contain propagating signals, such as modulated data signals transmitted through a carrier wave. Examples of a storage device 1210 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 1214 may include a keyboard, mouse, pen, voice input device, touch input device, display, speakers, printers, etc., and any combination thereof.

A memory device 1212 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1212 may also include one or more external storage devices or remotely located storage devices that do not pertain to propagated signals, such as modulated data signals transmitted through a carrier wave.

Memory devices 1212 may include an operating system 1216, telemetry data 1218, a normalized usage model component 1220, template generation component 1222, template database 1224, web crawler component 1226, web examples 1228, parameter type model generation component 1230, parameter type prediction model 1232, example generator 1234, parameter value analyzer 1236, data type format database 1238, and other application and data 1240.

Network 1204 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

A network 1204 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of generating examples for a command line interface to cover all the functions and features supported by the command line interface. The functions and features supported by the CLI are voluminous and may include hundreds of commands, each combined with multiple parameters, and corresponding parameter values. Human-generated examples from software developers are limited since they cover a small portion of the functions and features supported by the command line interface. Machine-generated examples are able to cover more commands and functions especially when there are numerous combinations that are possible. The machine-generated examples are also capable of generating correct usage examples of more complex combinations.

The technical features associated with addressing this problem involves a technique that generates examples from telemetry data showing actual usage patterns from current users and human-generated examples from web-based sources. Parameter values are often not available from some of these sources since they may contain personal and/or private data. The machine learning models are used to predict the data type associated with a command/parameter-set pair and used to select the appropriate parameter value from multiple known values. The predicted data type is also used to generate a parameter value when no known value exists.

Conclusion

A system is disclosed having one or more processors coupled to a memory. The memory has one or more programs. The one or more programs are stored in the memory and configured to be executed by the one or more processors. The one or more programs including instructions that: obtain a command and a parameter of the command, the command of a command line interface (CLI); predict a data type of a parameter value of the parameter using a machine learning model; use the predicted data type to search for a first parameter value from a plurality of parameter values for the parameter, the first parameter value having a same data type as the predicted data type; and generate a CLI example of usage of the command with the first parameter value.

In one aspect, the one or more programs include further instructions that: use a first classifier to predict a likelihood whether a first data type of a plurality of data types corresponds to the first parameter value.

In one aspect, the one or more programs include further instructions that: use a second classifier to predict a likelihood whether a second data type of the plurality of data types corresponds to the parameter value when the first classifier fails to predict that the parameter value takes on the first type.

In one aspect, the one or more programs include further instructions that: train the first classifier using features extracted from historical usage patterns of the command, the features including a command name, a parameter name and a module name.

In one aspect, the one or more programs include further instructions that: train the second classifier using features extracted from command descriptions and parameter descriptions.

In one aspect, the one or more programs include further instructions that: incorporate the generated CLI example into online documentation of the command and the parameter.

In one aspect, the one or more programs include further instructions that: obtain a data type format for the predicted data type; and use the data type format to find the first parameter value having the data type.

In one aspect, the first classifier and the second classifier are random forest classifiers.

A method is disclosed comprising: using a first classifier to predict a first data type of a parameter value of a paired command and parameter of a command line interface (CLI); when the first classifier fails to predict that the parameter value is of the first data type, using a second classifier to predict a second data type for the parameter value of the paired command and parameter; obtaining a parameter value matching the predicted second data type for the paired command and parameter from a plurality of parameter values for the paired command and parameter; and generating a CLI example of usage of the paired command and parameter including the obtained parameter value.

In one aspect, the method further comprises: obtaining a plurality of parameter values for the paired command and parameter from historical usage; generating a regular expression that matches a data format of the data type of the parameter value; and using the regular expression to find the parameter value for the paired command and parameter.

In one aspect, the method further comprises: ranking the plurality of parameter values of the paired command and parameter in descending order of usage frequency; and generating a regular expression that represents a highest-ranked data format of the parameter values of the paired command and parameter; and using the regular expression to obtain a parameter value that matches the predicted data type. In one aspect, the regular expression represents a single value, range of values or character string.

In one aspect, the method further comprises: incorporating the generated CLI example into online documentation of the command and the parameter. In one aspect, the first classifier is a random forest trained on command names, parameter names, and a module name from which an example was extracted. In one aspect, the second classifier is a random forest trained on descriptions of a command and descriptions of a parameter.

A device is disclose comprising: a processor and a memory. The at least one processor is configured to: generate a plurality of CLI examples showing usage of a command with a parameter and without a parameter value from a first historical usage source of CLI commands; obtain parameter values from a second historical usage source of CLI commands, wherein a parameter value is associated with a command and parameter of the plurality of CLI examples; infer a data type of a parameter value for a requested command and parameter pair using a machine learning model; find a select one of the parameter values having a same data type as the inferred data type from the second historical usage source; and generate a CLI example for the requested command and parameter pair using a select one of the plurality of CLI examples matching the requested command and parameter pair with the select one of the parameter values.

In one aspect, the machine learning model is composed of a first classifier and a second classifier, the first classifier predicts whether the requested command and parameter pair is of a first data type, the second classifier predicts whether the requested command and parameter pair are of a second data type, the first data type differs from the second data type.

In one aspect, the at least one processor is further configured to: associate a data type format for the inferred data type; and find the select one of the parameter values having a same data type as the inferred data type in the data type format. In one aspect, the at least one processor is further configured to: analyze frequency of occurrence of data type formats of a parameter from the parameter values; generate a regular expression representing a data type format having a highest frequency; and use the regular expression to find the select one of the parameter values having the same data type in the same data type format. In one aspect, the regular expression indicates a character string, single value or range of values.

In the description above, specific details of various aspect are provided. However, some aspects may be practiced with less than all of the specific details and in other aspects, certain methods, procedures, components, structures, devices, processes and/or functions are described in no more detail than to enable the various aspects of the invention for the sake of brevity and clarity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more processors coupled to a memory; and
   one or more programs, wherein the one or more programs are stored in the memory and configured to be executed by the one or more processors, the one or more programs including instructions to perform actions that:
   receive a request from a command line interface (CLI) for an example of usage of a command of the CLI, wherein the request includes a command and a parameter, the parameter associated with an unknown parameter value;
   predict a data type of the unknown parameter value of the parameter using a machine learning model given the command and the parameter;
   use the predicted data type to search for a first parameter value from a plurality of parameter values for the parameter, the first parameter value having a same data type as the predicted data type; and
   generate a CLI example of usage of the command, the CLI example including the command and the parameter with the first parameter value.

2. The system of claim 1, wherein the one or more programs include further instructions to perform actions that:
   use a first classifier to predict a likelihood whether a first data type of a plurality of data types corresponds to the first parameter value.

3. The system of claim 2, wherein the one or more programs include further instructions to perform actions that:
   use a second classifier to predict a likelihood whether a second data type of the plurality of data types corresponds to the first parameter value when the first classifier fails to predict that the first parameter value takes on the first data type.

4. The system of claim 3, wherein the one or more programs include further instructions to perform actions that:
   train the second classifier using features extracted from command descriptions and parameter descriptions.

5. The system of claim 3, wherein the first classifier and the second classifier are random forest classifiers.

6. The system of claim 2, wherein the one or more programs include further instructions to perform actions that:
   train the first classifier using features extracted from historical usage patterns of the command, the features including a command name, a parameter name and a module name.

7. The system of claim 1, wherein the one or more programs include further instructions to perform actions that:
   incorporate the generated CLI example into online documentation of the command and the parameter.

8. The system of claim 1, wherein the one or more programs include further instructions to perform actions that:
   obtain a data type format for the predicted data type; and
   use the data type format to find the first parameter value having the predicted data type.

9. A computer-implemented method, comprising:
   receiving a request from a command line interface (CLI) for an example of usage of a command of the CLI, wherein the request includes a paired command and parameter, the parameter having an unknown parameter value;
   using a first classifier to predict a first data type of the unknown parameter value of the paired command and parameter received from the command line interface (CLI);
   when the first classifier fails to predict that the unknown parameter value is of the first data type, using a second classifier to predict a second data type for the unknown parameter value of the paired command and parameter;
   obtaining a parameter value matching the predicted second data type for the paired command and parameter from a plurality of parameter values for the paired command and parameter; and
   generating a CLI example of usage of the paired command and parameter including the obtained parameter value.

10. The method of claim 9, further comprising:
    obtaining a plurality of parameter values for the paired command and parameter from historical usage;
    generating a regular expression that matches a data format of the data type of the parameter value; and
    using the regular expression to find the parameter value for the paired command and parameter.

11. The method of claim 9, further comprising:
    ranking the plurality of parameter values of the paired command and parameter in descending order of usage frequency; and
    generating a regular expression that represents a highest-ranked data format of the parameter values of the paired command and parameter; and
    using the regular expression to obtain a parameter value that matches the predicted data type.

12. The method of claim 10, wherein the regular expression represents a single value, range of values or character string.

13. The method of claim 9, further comprising:
    incorporating the generated CLI example into online documentation of the command and the parameter.

14. The method of claim 9, wherein the first classifier is a random forest trained on command names, parameter names, and a module name from which an example was extracted.

15. The method of claim 9, wherein the second classifier is a random forest trained on descriptions of a command and descriptions of a parameter.

16. A device, comprising:
a processor and a memory;
wherein the at least one processor is configured to perform acts that:
generate a plurality of command line interface (CLI) examples showing usage of a command with a parameter and without a parameter value from a first source of historical usage of CLI commands;
obtain parameter values from a second source of historical usage of CLI commands, wherein a parameter value is associated with a command and parameter of the plurality of CLI examples;
infer a data type of a parameter value for a requested command and parameter pair using a trained machine learning model;
find a select one of the parameter values having a same data type as the inferred data type from the second source of historical usage of CLI commands; and
generate a CLI example for the requested command and parameter pair using a select one of the plurality of CLI examples matching the requested command and parameter pair with the select one of the parameter values.

17. The device of claim 16, wherein the trained machine learning model is composed of a first classifier and a second classifier, the first classifier predicts whether the requested command and parameter pair is of a first data type, the second classifier predicts whether the requested command and parameter pair are of a second data type, the first data type differs from the second data type.

18. The device of claim 16, wherein the at least one processor is further configured to perform acts that:
associate a data type format for the inferred data type; and
find the select one of the parameter values having a same data type as the inferred data type in the data type format.

19. The device of claim 18, wherein the at least one processor is further configured to perform acts that:
analyze frequency of occurrence of data type formats of a parameter from the parameter values;
generate a regular expression representing a data type format having a highest frequency; and
use the regular expression to find the select one of the parameter values having the same data type in the same data type format.

20. The device of claim 19, wherein the regular expression indicates a character string, single value or range of values.

* * * * *